US007487018B2

(12) United States Patent
Afshar et al.

(10) Patent No.: US 7,487,018 B2
(45) Date of Patent: Feb. 3, 2009

(54) DATA MANAGEMENT SYSTEMS FOR COLLISION REPAIR COACHING

(75) Inventors: Farzam Afshar, Newport Beach, CA (US); Cynthia L. Granse, Naperville, IL (US); Mark E. Olson, Lake Forest Park, WA (US)

(73) Assignee: Verifacts Automotive, LLC, Newport Beach, CA (US)

( * ) Notice: Subject to any disclaimer, the term of this patent is extended or adjusted under 35 U.S.C. 154(b) by 243 days.

(21) Appl. No.: 11/196,374

(22) Filed: Aug. 2, 2005

(65) Prior Publication Data

US 2006/0031041 A1   Feb. 9, 2006

Related U.S. Application Data

(60) Provisional application No. 60/598,942, filed on Aug. 4, 2004.

(51) Int. Cl.
   *G06F 17/30* (2006.01)
(52) U.S. Cl. ............................................. 701/29; 705/7
(58) Field of Classification Search .................... 701/29, 701/30; 705/11, 7; 707/3, 4, 5, 6; 715/505–507; 434/350, 353
   See application file for complete search history.

(56) References Cited

U.S. PATENT DOCUMENTS

| | | | | |
|---|---|---|---|---|
| 5,722,418 | A | | 3/1998 | Bro |
| 5,734,890 | A | * | 3/1998 | Case et al. ...................... 707/5 |
| 5,765,138 | A | | 6/1998 | Aycock et al. |
| 6,161,101 | A | * | 12/2000 | Guinta et al. .................. 706/45 |
| 6,397,131 | B1 | | 5/2002 | Busch et al. |
| 6,738,748 | B2 | | 5/2004 | Wetzer |
| 6,754,874 | B1 | * | 6/2004 | Richman ...................... 715/507 |
| 2002/0072808 | A1 | * | 6/2002 | Li ................................... 700/5 |
| 2002/0137015 | A1 | | 9/2002 | Guinta et al. |
| 2002/0141348 | A1 | * | 10/2002 | Swix et al. .................. 370/252 |
| 2002/0143421 | A1 | | 10/2002 | Wetzer |
| 2002/0174112 | A1 | | 11/2002 | Costantino |
| 2002/0178049 | A1 | | 11/2002 | Bye |
| 2002/0194153 | A1 | | 12/2002 | Costantino et al. |
| 2003/0028498 | A1 | | 2/2003 | Hayes-Roth |
| 2003/0050830 | A1 | * | 3/2003 | Troyer ........................ 705/11 |
| 2003/0082508 | A1 | | 5/2003 | Barney |
| 2003/0115094 | A1 | | 6/2003 | Ammerman et al. |
| 2003/0120472 | A1 | | 6/2003 | Lind |
| 2003/0140021 | A1 | | 7/2003 | Ryan et al. |
| 2003/0153991 | A1 | | 8/2003 | Visser et al. |
| 2003/0187725 | A1 | | 10/2003 | Jotkowitz |
| 2003/0216957 | A1 | | 11/2003 | Florence et al. |
| 2003/0217025 | A1 | | 11/2003 | Costantino |
| 2004/0019616 | A1 | | 1/2004 | Moffatt |

* cited by examiner

*Primary Examiner*—Dalena Tran
(74) *Attorney, Agent, or Firm*—Brinks Hofer Gilson & Lione

(57) ABSTRACT

A system for on-site collection of evaluation data at a vehicle repair site installation is disclosed. Generally the system includes a mobile computing tool wirelessly connected to a database, a workflow operations guiding module that runs on the mobile computing tool, an evaluation module, a comparison module, a data-mining module, a certification module, a legal compliance module, and a repair procedure compliance module. As a vehicle is repaired, the workflow operations guiding module prompts a coach with questions. The evaluation module performs a quantitative analysis of the answers provided by the coach and the comparison module compares the result of the quantitative analysis against aggregated or averaged information. The certification module compares information from the comparison module against predetermined certification criteria and the data mining module identifies correlations, trends or patterns in collected data by the system.

56 Claims, 9 Drawing Sheets

ACME Body Shop
123 Main Street
Suite #200
Pasadena, CA 94404
Main: (626) 555-1212 / Fax: (626) 456-2382

Help | support@autoanticanup.com

Chades Green, Primary VeriFacts Coach
John Doe, Owner
Susan Doe, Owner
Chris Smith, Primary Manager (Shop Manager)
And John (vehicle inspector/Boot Manager)

Enter Technician Info
Please enter the info for the newly entered technician below.
Fields in BOLD are required.

This technician was entered into the system during the inspection on April 11, 2004. This technician had the following rating(s) and note(s):
* Rating: 0 for "Dirt/grind spot welds" in Body
* Rating: 10 for "Proper and complete welds" in Detail
* Note: Phil was uncooperative when trying to coach him on proper welding techniques

| | | | |
|---|---|---|---|
| First Name: | Phil | Primary Phone: | Cell |
| Last Name: | Atkinson | Shop Phone: | (626) 555-1212  Extension: |
| Name on Certificates: | Philip J. Atkinson | Cell Phone: | (626) 458-1234 |
| SSN: | 111-72-1234 | | |
| Departments (Check all that apply) | ☑ Paint ☐ Detail ☐ Body | Specialties: | |
| | | Years of Experience: | 12 |
| Experience Level: | Journeyman | Prior Certifications: | ☑ I-CAR ☐ ASE ☐ VeriFacts ☐ Other: |
| Home Address | | | |
| Address 1: | 1500 Maple Avenue | | |
| Address 2: | Apt. 1221 | | |
| City: | South Pasadena | | |
| State | California  Zip: 91606 | | |

[Save]  [Don't Add]

DATA MANAGEMENT SYSTEMS FOR COLLISION REPAIR COACHING

RELATED APPLICATIONS

The present patent document claims the benefit of the filing date under 35 U.S.C. §119(e) of Provisional U.S. Patent Application Ser. No. 60/598,942, filed Aug. 4, 2004, the entirety of which is hereby incorporated by reference.

FIELD OF THE INVENTION

The invention relates generally to tools for monitoring and coaching automotive repair procedures, and more specifically to systems and methods for coaching, verifying, and certifying automotive collision repair.

BACKGROUND

Modern automotive maintenance and repair processes require the intensive use of information. As automobile models and the technology they use change from year to year, repair facilities need to constantly acquire and manage new data and knowledge on the appropriate technologies, procedures, and equipment used in repair and maintenance processes. This challenge is compounded by parallel changes in the tools and techniques used for the automobile industry. Many components of the automotive repair industry face these challenges, from collision repair, to inspection procedures, to mechanical repair.

One category of challenges involves the coaching of technical personnel performing the maintenance, inspection, and repairs of automobiles. As procedures change and as new personnel enter the industry or expand the scope of the work they perform, managers need to reliably review and improve the skills of their technical personnel and ensure that a high level of competence is maintained among the technical professionals in the industry.

BRIEF SUMMARY

Described herein is a system for on-site collection of evaluation data at a vehicle repair site installation, such as a collision repair or mechanical repair facility. In one implementation, the system includes a mobile computing tool wirelessly connected to a database, a workflow operations guiding module that runs on the mobile computing tool, an evaluation and verification module, a comparison module, a data mining module, a certification module, a legal compliance module, and a repair procedure compliance module. A workflow for a vehicle undergoing repairs may involve a series of repair procedures selected for the repairs needed on the vehicle. In some cases, certain repair procedures in a workflow may need to be performed in specified sequences. For example, although a fender replacement procedure may be performed before or after a door-dent repair procedure on a particular model of car, these steps may need to be performed prior to a whole-car paint procedure. A review and evaluation coach may use the mobile computing tool to monitor and review a vehicle undergoing a vehicle repair workflow and provide feedback to the technician and to the site installation where the repair is performed. The observations may be made in real time, as a technician performs the steps in a repair procedure. Alternatively, or in addition, the observations may be made after a technician has completed one or more steps of a repair, so that a coach may review a finished or partially finished repair job or operation or process. During the coach's observation, the workflow operations guiding module runs on the mobile computing tool and prompts the coach with questions on steps being performed by the technician. The coach may enter responses to the queries by selecting responses indicative of the technician's activities, or lack thereof, the technician's competence, and the quality of the work performed on the vehicle under repair. The responses may include textual responses, answers to yes/no questions (such as a check/no check or a pass/fail query), and multiple-choice responses such as reason codes that indicate the reason for the technician's successful or unsuccessful completion of each repair step. The workflow operations guiding module may include decision branching. For example, queries posed to the coach may depend on the responses entered by the coach to previous queries.

The evaluation module receives the responses to the queries and performs a quantitative analysis of the responses. The quantitative analysis may be performed using a scoring matrix obtained from the database. The evaluation module may generate a review summary based on the evaluation information.

The evaluation module may include software running on the mobile computing tool, or on a central server computer, or both. The evaluation module may generate immediate reports to provide coaching feedback to the technician. To provide coaching feedback, the evaluation module may identify procedures that can be targeted for improvement, or may provide advice on how to adjust the technician's practices. The evaluation module may also generate management reports summarizing one or more technician evaluations for a site manager, and periodic site reports for a site installation or enterprise.

The comparison module may include software for comparing the evaluation information for a technician, a site installation, or a group of site installations against other technicians, site installations, groups of site installations, or other industry- or customer-specific metrics. The certification module may include software for comparing a technician, a site installation, or a group of site installations against predetermined certification criteria to determine if a certification standard has been met. The certification module may provide feedback on categories of improvement needed for successful certification. The data mining module may include software for identifying correlations or trends or patterns in collected data, based on factors such as: the identity of a technician, site installation, or group of site installations; type of vehicle undergoing repair; characteristics of the site installation; geographical location; customized demographic criteria, and other factors.

The legal compliance module verifies whether the repair blueprint developed by the repair facility for the repair conforms to the legal requirements defined by regulatory agencies, such as the Bureau of Automotive Repair or other local, state and federal agencies. The repair procedure compliance module verifies whether the repair blueprint developed by the repair facility for the repair conforms to the repair standards and requirements defined by various sources, such as the vehicle manufacturer, vehicle testing organizations, industry training organizations, etc., for the specific vehicle undergoing repair. The legal compliance and repair procedure compliance modules contain all of the assimilated rules and reference data required to perform the legal and repair procedure compliance verifications.

Also described is a method for providing coaching for repair technicians. In one implementation, the method includes acts in which while (or shortly after) a repair technician performs a repair procedure on a vehicle, an automated guiding interface poses a query on a repair step being performed, and a coach enters a response to the query. As the technician proceeds through a repair procedure in a workflow, the automated guiding interface continues to pose appropriate queries. One or more of the subsequent queries may be selected and posed based on the response to a previous query. During the repair procedure or after the completion of the procedure, coaching information is generated and provided for the repair technician. Coaching information may also be generated for environmental or site-specific conditions which may influence the technician's work product or repair methods utilized. The responses entered by the coach and any generated coaching information may be transmitted for storage at a central server. The stored information may be used for verification, certification, comparison, data mining, or other analyses.

BRIEF DESCRIPTION OF SEVERAL VIEWS OF THE DRAWINGS

Embodiments of the invention can be better understood with reference to the following drawings and description. The components in the figures are not necessarily to scale, emphasis instead being placed upon illustrating the principles of these embodiments. Moreover, in the figures, like referenced numerals designate corresponding parts throughout the different views.

FIG. 8 is an example of a screenshot for an interface for interacting with a remote database from a site installation.

FIG. 9 is an example of a screenshot for an interface for retrieving information from a remote database at a site installation.

DETAILED DESCRIPTION

Figure 1:
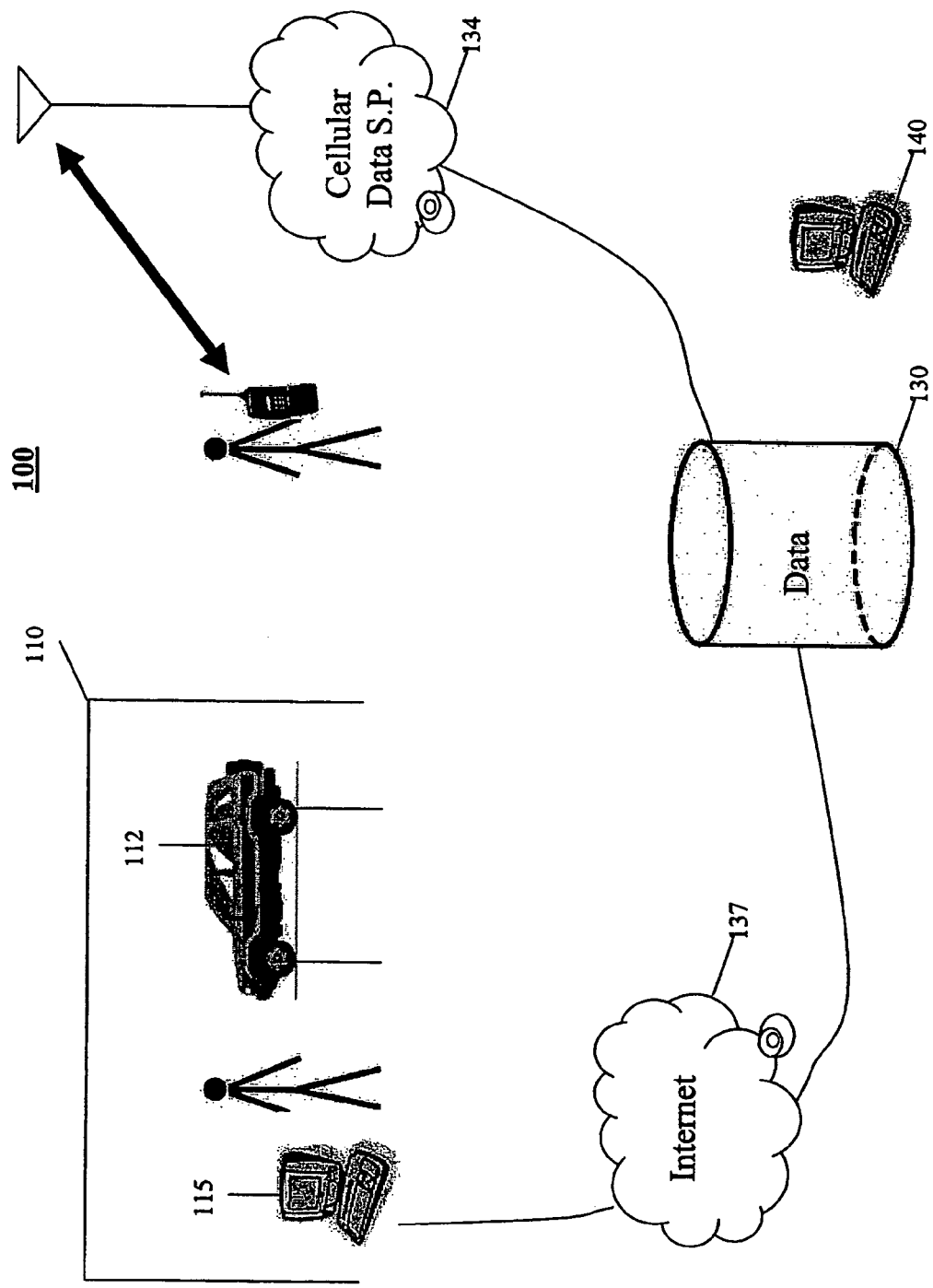
FIG. 1 shows an example of an environment for coaching of automotive services.

FIG. 1 shows an example of an environment for coaching of automotive services. This depiction includes a site installation 110 at which a vehicle 112 is undergoing repair, and which uses a computer system 115. A mobile computing tool 120 is used to assist in coaching of the activities at the site installation 110. Generally, the mobile computing tool 120 may be a personal digital assistant ("PDA"), a laptop or tablet computer, a cellular phone, or any other portable data device known in the art. The mobile computing tool is connected through a wireless link 132 and a service provider 134 to a database 130 to update and exchange information. The database 130 may also be maintained through one or more server computers 140. The data may be shared with other computers, such as the computer system 115, through an information network 137, such as the internet. Any person that participates in the repair process, such as technicians and managers, may also update information in the database 130 through the computer system 115.

The site installation 110 may be a location where automotive services, such as collision repair, vehicle maintenance, vehicle inspection, or automotive mechanical repair are performed. At the site installation, a number of technicians may work on a vehicle 112 undergoing repair. Generally, a technician may be any person that participates in the repair process. The technicians may follow repair procedures for the type of repairs needed on the vehicle 112. The technicians may obtain the repair information from reference manuals, spoken instructions, shared knowledge, or computer systems 115 used for reference.

To maintain and improve their skills, technicians and their managers may rely on coaches who may review the performance of the technicians and managers, and who may review the operations of the site installation 110 as a unit. Coaches may assist technicians, such as the shop personnel in a collision repair facility or mechanics in a mechanical repair facility, to maintain and expand their technical competence in a field whose knowledge base undergoes continuous change and growth. Coaches may also assist managers with overall quality review of a site installation's work, and with making ongoing improvements throughout the site installation. To help monitor and improve the level of technical competence in a site installation, coaches may perform periodic visits to the site installation, such as weekly, monthly, or annual visits to the site installation. During visits, coaches may provide real-time feedback for technicians as the technicians carry out repair steps on a vehicle being repaired, and may further provide review feedback at the conclusion of a repair procedure, at the conclusion of a workflow (a defined portion or series of steps in a repair), or at the conclusion of the repair process. Coaches may further provide on-the-job professional review and advice for groups of technicians and managers during visits, and may evaluate and monitor technical and procedural practices of the technicians, managers, and support staff. One form of value added by coaches may be an ongoing improvement in the quality and efficiency of technical and procedural operations of the site installation 110. As an external observer, a coach may verify the quality, propriety, or completeness of procedures and workflows performed at a site installation. Such a verification by a neutral observer can be a valuable assessment of automotive repair procedures.

With appropriate coordination, coaches may also improve the overall quality and efficiency and consistency of an enterprise of related site installations, such as a set of site installations under common ownership, or common branding, or in a franchise relationship or other relationship. Additionally, coaches may guide technicians, site installations, and enterprises towards the achievement of recognized or customized certification standards. Coaches may also perform a certification-reporting function, whereby the coaches identify technicians, site installations, and enterprises that have qualified for various certifications.

A coach may use a mobile computing tool 120 to organize and collect information during a site visit. The mobile computing tool may be, for example, a personal digital assistant (PDA), a notebook or tablet computer, a data-enabled cellular telephone, or any other portable data device, and may include a digital camera or an interface to a portable camera. The mobile computing tool 120 shares information with the database 130 and the server computers 140 through the wireless link 132 and the service provider 134. The wireless link 132 may be a cellular data link provided by a cellular service provider. Other wireless links may also be used, with or without a service provider. For example, the wireless link 132 and the service provider 134 may be augmented or replaced by a satellite link (not shown). Further, the mobile computing tool 120 may be equipped with a backup port (not shown) that allows the mobile computing tool 120 to connect with the database 130 through alternative networks. The backup port may be built into the mobile computing tool 120 or may be disposed in a cradle unit that attaches to the mobile computing tool 120, and may be particularly helpful to a coach working in a region where the wireless link 132 is unavailable or unreliable. The backup port may provide alternative connections to the database 130 through links such as through a telephone line, or through links made via a local computer (such as the computer system 115 or server computers 140) with a USB, Bluetooth™, infrared, serial, or parallel link, or with a wired or wireless Ethernet link, or other links.

The mobile computing tools 120 may be distributed to a team of coaches who provide coaching services to a number of site installations 110, as further described below. Mobile computing tools 120 may be shared among coaches, or may be assigned to each coach. Alternatively, mobile computing tools 120 may be provided only to coaches with the best ability to efficiently use the features provided in the tool. Coaches without mobile computing tools may continue to enter information and evaluation data into the database 130 through networked computers and other interfaces, such as computer system 115.

Software running on the mobile computing tool 120 and the server computers 140 may be written in a variety of languages, such as C, C++, Java, or others, using a variety of programming architectures, including interpreted, compiled, or JIT translations. The software may be configured to run on a variety of operating systems, such as PalmOS™, Windows CE™, Windows™, Linux™, MacOS™, Microsoft.net™, and others.

Figure 2:
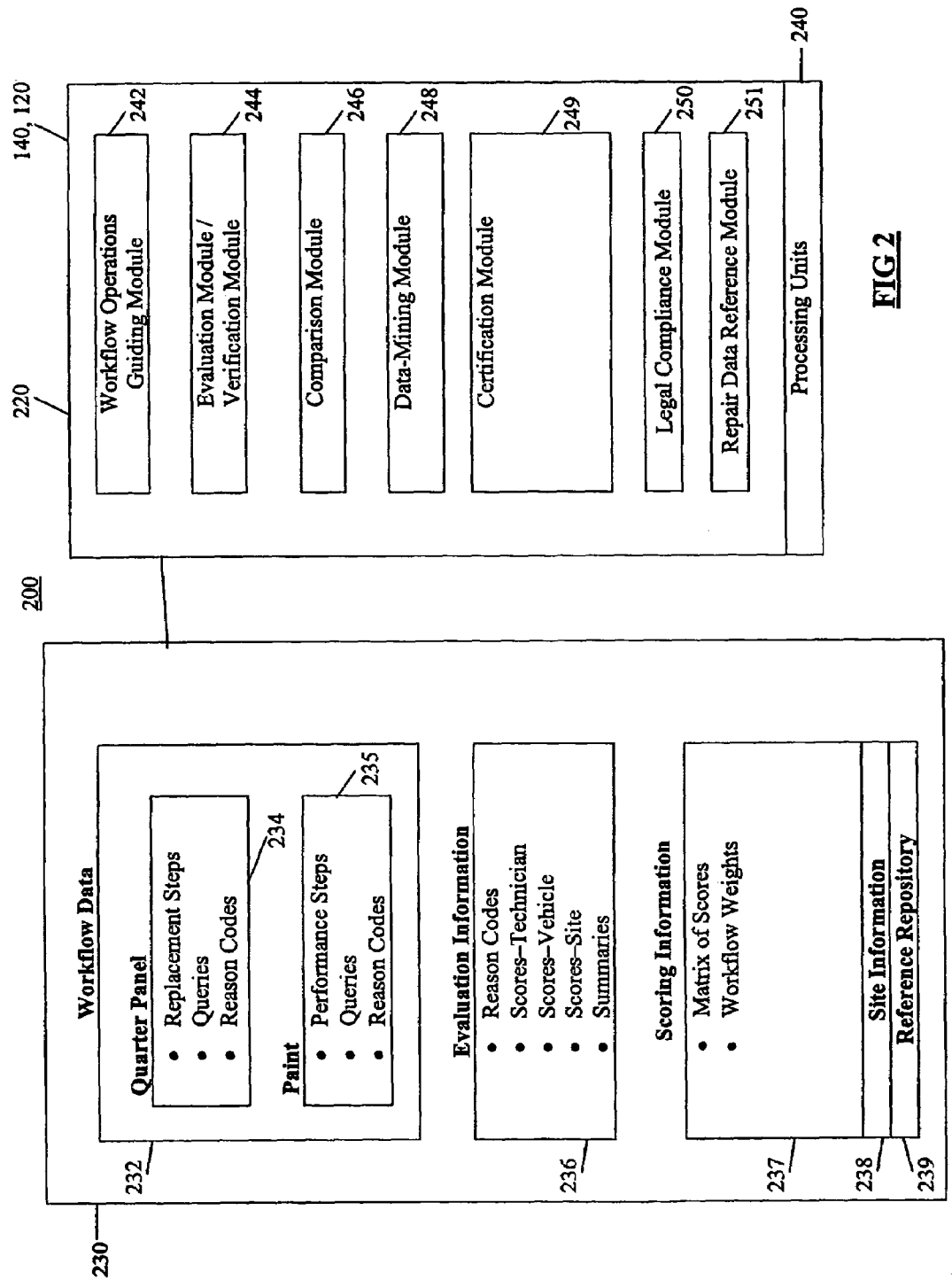
FIG. 2 illustrates one implementation of data and software usable in a coaching system for collision repair services.

FIG. 2 illustrates one implementation of data and software usable in a coaching system for collision repair services. This figure shows a data collection 230 and a collection of software tools 220 used in conjunction with one or more processing units 240. In relation to the environment depicted in FIG. 1, the data collection 230 and the software tools 220 may be stored on a variety of media, such as magnetic media, semiconductor media, or optical media, made accessible through the database 130, the server computers 140, and the mobile computing tool 120. The software tools 220 are configured to run on the one or more processing units 240, which may be deployed in the mobile computing tool 120 or in the server computers 140.

The data collection 230 includes workflow data 232, evaluation information 236, scoring information 237, site information 238, and a reference repository 239. The workflow data 232 specifies procedures and steps that may be used in a variety of workflows for collision repair. For example, as illustrated the workflow data 232 includes data on repair procedures for the replacement of quarter panels for automobiles 234 and on a procedure for the painting of an automobile 235. The repair procedures may be indexed or categorized according to the make, model, and year of the automobile under repair. The repair procedures may further be linked to combine larger procedures, such as, for example, in a case where a bumper repair procedure may be linked to a subsequently required paint procedure.

Each procedure in the workflow data 232 may include a description of the steps required in the procedure, in a form that would be useful for a coach reading the steps on a mobile computing tool 120. The workflow data 232 may also include queries associated with each step to prompt a coach for information on the manner in which a technician performs the step. The workflow data 232 may further include prompts for various reason codes to allow a coach to expound on the manner in which a technician performs the step.

For example, a coach may observe a vehicle undergoing the procedure of three-dimensional (3D) measuring, as an initial diagnostic (or as a final check) in collision repair. The process of 3D measuring involves mounting a vehicle on a rack with clamps connected to the vehicle at appropriate points. The positions of the clamps are then measured in order to detect any deformations in the frame or unibody structure of the automobile. To start, the coach may use a mobile computing tool to record identifying information on the vehicle undergoing the repair, the technician performing the procedure, and the site installation at which the repair is being performed. The coach may then proceed to observe the technician performing the 3D measuring, and record observations on the mobile computing tool in response to prompts generated by the mobile computing tool.

One of the steps in 3D measuring may involve a correct application of clamps to the vehicle during the initial phases of the 3D measuring procedure. Accordingly, the procedure data 232 may include appropriate reference information so that the mobile computing tool 120 prompts the coach to check "Were the clamps applied properly?"

In response, the coach may enter a "Yes" or a "No" response. This response may be entered, for convenience, through a selection interface, such as a checkbox or radio button interface on the mobile computing tool. The coach may additionally supplement this response with the selection of a reason code in the workflow data 232. A reason code is a discrete identifier of a reason for a coach's response to an automatically prompted query. For example, a specific reason code may signify "Clamps placed in incorrect location for this model of vehicle" in the context of a query regarding proper application of clamps during a 3D measurement procedure.

In addition to selecting a reason code, the coach may further enter additional textual notes. If the step was not properly completed by the technician, the coach may select a corrective action. For example, the coach may record a decision to escalate the issue to require a discussion with the technician's manager. Alternatively, the coach may record a decision to follow up with personal instruction to the technician, or record a note to receive a prompt for follow-up discussion or checking in a subsequent site visit.

All the prompting information to the coach may be pre-stored in the workflow data 232. The responses from the coach may be stored as the evaluation information 236. The evaluation information may include the responses from the coach during an observation of various procedures performed by a technician as part of a workflow for a vehicle. The responses may include reason codes entered by the coach. Further, the evaluation information 236 may include numerical scores based on the responses entered by the coach, along with summaries of a coach's evaluation. The manner in which the numeric scores and the summaries may be generated is described below.

Thus, the data collection 230 includes information on queries posed to coaches, such as the queries and the possible reason codes in the workflow data 232, and responses from the coaches, such as the coach's answer and the selected reason codes in the evaluation information 236. In addition, the data collection includes the scoring information 237. The scoring information is used to generate numerical scores from the responses entered by a coach. For example, the scoring information may include a matrix of scores that holds numeric score values, each of which corresponds to a particular reason code or other response entered by a coach for a particular step of a particular procedure.

For example, consider the situation described above, where a coach notes that a technician has failed to properly apply clamps during 3D measurement. In response to the query "Were the clamps applied properly?," the coach may select responses of "No"/"Clamps placed in incorrect location for this model of vehicle." These responses may be stored as digital information identifying the reason code. For this procedure, this query number, and this response, the matrix of scores may hold a numeric value of "3," indicating that the technician has obtained a relatively low score for this step in the 3D measurement procedure. The score would be correspondingly higher if the technician had correctly performed the workflow step, and correspondingly lower if the technician had performed in a worse manner. For example, the matrix of scores may hold a value of "10" for reason codes indicating that the coach's response was "Yes"/"Clamps properly positioned." The matrix of scores may hold a value of "0" for reason codes indicating that the coach's response was "No"/"Clamps not applied to vehicle."

Numerically, a score in the matrix of scores may be designated by a variable s. The score may be indexed by the particular query and response to which it corresponds, which may be designated by variables q and r, respectively. Thus, the score generated from the matrix may be indicated by the quantity s(q,r), which may be seen as a reference table or as one implementation of the matrix of scores. If a coach scores a total of N steps for a technician working on a workflow for a vehicle, the resulting average score may be calculated numerically. For example, one implementation may use a formula having the following form.

$$\text{Score} = \frac{1}{N} \sum_{i=1}^{N} s(q_i, r_i) w.$$

Here i is an index for a particular query, and w is a weighting factor for the particular procedure being evaluated. The indexes $q_i$ and $r_i$ indicate the various queries and responses, respectively. In addition to the averaging indicted in the above formula, additional averaging may be performed over several observed procedure s, each of which may have a different value of weighting factor w. The numeric score value and the weighting factor may be adjusted by system administrators. In some implementations, the weighting factor may be adjusted to allow user customization. The adjustability of the workflow weighting factor allows an independent control over the contribution of different procedures as reflected in total scores. Similar adjustability may also be provided for aspects of the matrix of scores.

Other scoring techniques are also envisioned. For example, a scoring system may be used without reason codes. Instead, the scoring may be based on a binary evaluation, such as a series of pass/fail or correct/incorrect responses entered by a coach. In this case a scoring technique may use a calculation with a simplified formula in which a coach's response is represented by a binary variable r having a value of 0 or 1.

$$\text{Score} = \frac{1}{N} \sum_{i=1}^{N} s(q_i) r_i w.$$

Various combinations of these scoring systems may also be implemented, and may also use additional weighting factors. For example, weighting factors and other scoring tools may be employed to reflect degrees of difficulty based on the model of car under repair, on the newness of a procedure, on the experience level of a technician, on the degree of difficulty of an overall workflow, or on the precision required in a particular aspect of a repair, among others.

The data collection 230 may also include the site information 238 and the reference repository 239. The site information 238 may hold data regarding individual site installations. For example, the site information 238 may include the names and positions of technical and non-technical personnel at a site installation, the types of equipment available at the site installation, and information on previous coaching and evaluations performed at the site installation, among others. The mobile computing tool 120 may use data from the site information 238 to assist a coach in locating a site installation to be reviewed, to recall the names of staff members at the site installation, and to recall notes on previous visits to the site installation. The reference repository 239 may include a variety of reference material of interest to coaches, technicians, and other personnel. The reference repository may be accessible through portable devices such as the mobile computing tool 120 or through network computers such as the computer system 115, or server computers 140. The reference repository may include internet links for information on collision repair materials and processes, a library of articles for teaching and reference on collision repair of automobiles, diagrams showing procedures and detailed procedures for collision repair of automobiles, and other industry-specific information to support the coaching, technical, and procedural activities of technicians and site installations.

The software tools 220 shown in FIG. 2 include a workflow operations guiding module 242, an evaluation and verification module 244, a comparison module 246, a data-mining module 248, a certification module 249, a legal compliance module 250, and repair procedure compliance module 251. These modules may be implemented using various combinations of logic circuitry, including software implementations that may run on the processing units 240 in the mobile computing tool 120 or the server computers 140.

The workflow operations guiding module 242 may be configured to run on the mobile computing tool 120. The workflow operations guiding module 242 may provide instructions, prompts, and dialog interfaces to guide a user through a coaching of one or more repair procedures or workflows. For example, the workflow operations guiding module 242 may use information from the workflow data 232 to provide a user interface that follows a coach through various steps in a repair procedure. The workflow operations guiding module 242 may prompt the coach with questions for evaluating each step in a procedure. The sequence of questions may be predetermined and linear, or may include decision-point branching, in which the choice of which questions to pose depends on answers received for previous questions. This branching may be based on decision point data stored in the workflow data 232. The workflow operations guiding module 242 may allow a coach to skip steps. For example, if circumstances require a technician to omit or temporarily delay a particular procedure step, or if that procedure step is not yet completed, the coach may skip the query for that step and proceed to observe the next step or procedure performed by the technician—or by another technician. The workflow operations guiding module 242 may also allow a coach to review and edit the responses entered for each query. The workflow operations guiding module 242 may then store the response information received during observation of a procedure in memory on the mobile computing tool 120 (and/or in the database 130), as new data for the evaluation information 236.

The evaluation module 244 uses data gathered through the workflow operations guiding module 242 and other data in the evaluation information 236 to create a review of the evaluation information 236. The evaluation module 244 evaluates and verifies evaluation information 236 from assimilated sources such as vehicle manufacturers, vehicle testing organizations, industry-recognized training organizations, etc. The review may be in the form of numeric scores for technicians, site installations, and enterprises. The evaluation module 244 may use the scoring information 237 to generate the numeric scores from the received evaluation information 236. The numeric scores may be combined with textual information supplied by a coach through the evaluation module to generate reports for the evaluation and coaching of technicians and other personnel, site installations, and enterprises. Outputs generated by the evaluation module may be stored in the evaluation information 236. Technicians, managers, and others may be provided access to the outputs through printed hard copies or through electronic access via computers such as the computer system 115 or the server computers 140.

The software tools 220 may include components for verifying one or more procedures that a technician has performed on an automobile. That is, as an automobile proceeds through a workflow, the software tools 220 may guide a coach through appropriate analyses so that the coach can perform an objective third-party certification that verifies the observed procedures have been properly executed according to predetermined criteria. The mobile computing tool 120 may be configured with software that allows a coach, as an external observer, to verify the quality, propriety, or completeness of procedures and workflows performed at a site installation. Such a verification of manufacturer-required or industry accepted best practices by a neutral observer can be a valuable assessment of automotive repair procedures. In the example of FIG. 2, the verification is implemented in the evaluation module 244, so that this module is a combined evaluation and verification module. In this example, verification data are gathered while the responses from a coach are analyzed by the evaluation module 244. In other implementations, the verification procedures may be implemented by other modules or combinations of modules. For example, verification may be implemented by the workflow operations guiding module 242, so that a mobile computing tool 120 collects verification data immediately as a coach enters responses to queries on the mobile computing tool 120. In other embodiments, the workflow operations guiding module 242 and the evaluation module 244 cooperate to verify operations and procedures performed by a technician.

The comparison module 246 reviews the evaluation information 236 and generates comparison summaries for technicians, managers and other shop personnel. The comparison summaries may be generated in hard copy or electronically. For example, the comparison module may generate a summary report comparing a particular technician's scoring information with an overall or average scoring for technicians in the same site installation. Such comparisons may be helpful for evaluation or professional coaching of a technician.

The comparison summary may be stored among the summary information in the evaluation information 236. The site installation or shop personnel may obtain access to the comparison summary through the computer system 115. Other comparisons that may be generated include: comparisons of a technician with other technicians in the same pay grade, comparisons of a technician with other technicians in the same city or other geographical region, comparisons of a technician with other technicians in the same enterprise, comparisons of a technician with all technicians for whom data are available, or others. Combinations of these comparisons are also possible. For example, the comparison module may be configured to generate a comparison of a technician with all other technicians in the same enterprise, and in the same city, and with the same certifications.

In addition to preparing comparisons of technicians, the comparison module 246 may also generate comparisons of site installations, groups of site installations, and enterprises. For example, the comparison module 246 may be configured to compare one enterprise against another. Many other comparisons are also possible, such as comparing a site installation with other site installations in the same enterprise but in a different region of the country, with similar or different demographics, etc.

The comparison module 246 may also allow specialization or customization of comparison groups. For example the comparison module 246 may allow a peer group to be defined as a group of site installations within a particular revenue bracket and having a service relationship with a particular insurance company. Such customization may be implemented by and accessed through a central server or the database 130. Alternatively, or in addition, such customized peer groups may be defined by individual users, such as the managers of site installations. Other examples of criteria by which peer groups may be defined include technical criteria (type of equipment available at a site installation or throughout an enterprise, models of vehicles served by technicians at a site installation, certifications attained by technicians, certifications attained by site installations, number of service bays present in a site installation, or others), business criteria (revenue levels, number of employees, status as a woman-owned or woman-operated or minority-owned company, affiliation with other enterprises or insurance companies, or others), geographical criteria (customized combinations and definitions of city/state/county/region, for example), other criteria, and combinations thereof.

As part of the vehicle repair process, site personnel and coaches typically compare the repair process to repair rules and guidelines to validate that the repair process complies with local, state or federal legal requirements, as well as vehicle-specific repair procedures identified by a vehicle's manufacturer, vehicle testing organizations or industry training organizations. The repair rules and guidelines are generally validated at three points in time surrounding the repair process. The repair rules and guidelines are first validated before the repair process begins. The repair rules and guidelines are then validated during the repair process, and again after the repair process is complete.

Generally, shop personnel validate the repair rules and guidelines before the repair process begins and a coach validates the repair rules and guidelines both during the repair process and after the repair process is completed. A coach validates the repair rules and guidelines by measuring and assessing work performed by the shop personnel. The legal compliance module 250 and the repair procedure compliance module 251 enable the coach and shop personnel to share common repair rules and guidelines to ensure a cohesive adherence to repair rules and guidelines throughout the entire repair process. The legal compliance module 250 and repair procedure compliance module 251 are unique in that both shop personnel and the coach may use similar modules 250, 251, where only the coach will typically use the workflow operations guiding module 242, evaluation and verification module 244, comparison module 246, data-mining module 248, and certification module 249.

Shop personnel may use the legal compliance module 250 and the repair procedure compliance module 251 as they develop a repair blueprint for a vehicle. A coach may then use the repair blueprint, and a legal compliance module 250 and repair procedure compliance module 251 similar to those used by the site personnel to develop the repair blueprint, to assist the coach in evaluating site personnel who developed the repair blueprint and site personnel who are responsible for repairing a vehicle according to the repair blueprint.

Generally, the legal compliance module 250 and the repair procedure compliance module 251 serve as an automated, "upfront" validation that the high-level requirements for a quality repair will be met through an accurate repair blueprint, in contrast to the workflow operations guiding module and the evaluation and verification module which identify how well the actual repair has been made through a step-by-step evaluation and analysis process of the repair procedures that the repair technician(s) used.

Repair technicians use the repair blueprint as their work order or roadmap to determine what repairs are required on the vehicle. Therefore, the repair blueprint is typically specific to the year, make and model of vehicle and developed by an estimator before repairs commence on the vehicle. The developed repair blueprint should comply with any local, state or federal legal requirements, and any vehicle-specific repair procedures identified by a vehicle's manufacturer, vehicle testing organizations or industry training organizations. If the repair blueprint does not comply with legal or repair procedure requirements, the resultant vehicle repair will likely not satisfy legal or repair procedure requirements.

Typically, the legal compliance module 250 will review a repair blueprint by analyzing information in predetermined data fields of the repair blueprint to determine whether the individual items in the blueprint comply with local, state or federal rules, as applicable. This analysis may be done in realtime, interactive mode on each individual item as the repair blueprint is being developed, or after the repair blueprint has been developed through a batch process which will analyze the entire blueprint at once. The legal compliance module will select the appropriate legal compliance rules from the database and apply them against the repair blueprint to determine whether the repair blueprint passes a compliance test. In some cases, the rules will be "hard" rules which must be complied with, whereas other rules may serve as suggestions to improve the repair blueprint.

In one example, in the state of California, the Bureau of Automotive repair requires that a quarter panel replacement operation be described as a "section" on the repair blueprint if only a portion of the quarter panel will be installed on the vehicle. In this example, the legal compliance module will analyze the repair blueprint, select the appropriate legal compliance rules from the database (in this example, for California), compare the rules against the operations included on the repair blueprint (in this example, "replace quarter panel") and pose the appropriate question to the user (in this example, "Will the entire quarter panel be installed or just a partial replacement?"). If the answer is "partial," the system will prompt the user to change the operation in the repair blueprint from "replace" to "section." In another example, if additional damage is found on the vehicle after the original repair blueprint has been developed, certain states may require written authorization from the vehicle owner prior to commencing any additional repairs on the vehicle. In this example, the legal compliance module 250 would determine that a supplemental repair blueprint is being developed, select the appropriate legal compliance rules from the database, and prompt the user to document the method of authorization obtained, such as whether authorization was done in person or through e-mail, etc., name of the person who authorized the repairs, the date and time of the authorization, etc.

Typically, the repair procedure compliance module 251 will review a repair blueprint by analyzing information in predetermined data fields of the repair blueprint to determine whether individual items in the repair blueprint comply with any vehicle-specific repair procedures identified by the vehicle's manufacturer, vehicle testing organizations or industry training organizations. The repair procedure compliance module 251 may determine whether individual items in the repair blue print comply with vehicle-specific procedures in a real-time, interactive mode as the repair blueprint is being developed, or after the repair blueprint has been developed through a batch process which will analyze the entire repair blueprint at once. The repair procedure compliance module 251 will select the appropriate repair procedure compliance rules from the database and apply them against the repair blueprint to determine whether the repair blueprint passes a compliance test. Repair procedure compliance rules may follow a hierarchy approach, based on the specific vehicle, operation and part identified in the repair blueprint. At the most detailed level, repair procedure compliance rules will apply to a specific repair operation (such as "replace", "section", "remove and install", "remove and replace", etc.) and a specific vehicle part (such as a "door skin", "frame rail", "upper unibody frame", etc.) and a specific vehicle (such as "2002 Honda Pilot with VIN number 12345"). The following illustrates how the hierarchy convention may apply:

Retrieve and apply any repair procedure rules for the vehicle Year, Make, Model and VIN.

If no repair procedure rules are available for the vehicle Year, Make, Model and VIN, retrieve and apply any repair procedure rules for the vehicle Year, Make and Model.

If no repair procedure rules are available for the vehicle Year, Make and Model, retrieve and apply any repair procedure rules for the vehicle Make and Model.

If no repair procedure rules are available for the vehicle Make and Model, retrieve and apply any repair procedure rules for the vehicle Make.

If no repair procedure rules are available for the vehicle Make, retrieve and apply any general repair procedure rules for the repair operation.

As an example, the repair procedure compliance module 251 may contain three rules: one rule regarding a Toyota Tundra which indicates that the lower perimeter frame rail can not be sectioned, a second rule which applies to any Toyota frame rail which indicates the upper unibody frame rail can not be sectioned, and a third rule which applies to any frame rail on any vehicle. In this example, if the repair blueprint is developed for a 2004 Toyota Tundra and identifies that the upper unibody frame rail is being sectioned, the repair procedure compliance module 251 will analyze the repair blueprint, select the appropriate repair compliance rules from the database (in this example, rule number two for any Toyota frame rail since the upper unibody frame is being repaired, not the lower perimeter frame), and indicate to the user that the selected operation is invalid for the vehicle being repaired.

Once site personnel develop the repair blueprint and the repair process begins on the vehicle, the coach may review the repair blueprint to confirm the vehicle is being repaired, or has been repaired, in compliance with the repair blueprint. In one embodiment, a copy of the repair blueprint is transferred electronically to the mobile computing tool of the coach using industry-standard communication methods defined by the Collision Industry Electronic Commerce Association (CIECA) or through the use of a proprietary interface method. In other embodiments, a paper copy of the blueprint may be made available to the coach to facilitate the review process.

Once the coach receives the repair blueprint, the coach may access a legal compliance module 250 or a repair procedure compliance module 251 on the mobile computing tool similar to those used by the site personnel to develop the repair blueprint. However, the legal compliance module 250 and repair procedure compliance module 251 accessed by the coach may not be the same legal compliance module 250 and repair procedure compliance module 251 used by the site personnel to develop the repair blueprint. The legal compliance module 250 and repair procedure compliance modules 251 accessed by the coach provide reference information that the coach can use in evaluating the site personnel. Typically, the modules 250, 251 provide the coach with a series of questions on the mobile computing tool used to evaluate whether the repair blueprint complies with local, state or federal legal requirements, or vehicle-specific repair procedures identified by a vehicle's manufacturer, vehicle testing organizations or industry training organizations. In one embodiment, the most recent compliance rules may be downloaded wirelessly when the coach connects the mobile computing tool to a server to download new evaluation assignments.

In addition to evaluating shop personnel, a coach may also use the repair procedure compliance module 251 as a tool to mediate disputes between shop personnel, customers, and insurance company personnel. During development of a repair blueprint, it is not uncommon for disputes to arise between shop personnel, customers and insurance company personnel regarding the best method for repairing a damaged vehicle. To mediate a dispute, shop personnel may request a coach serve as an independent third-party mediator. Along with the mediation request, shop personnel may send supporting documentation to the coach such as the repair blueprint, digital images, and frame and alignment specifications. The coach may then view the mediation request and supporting documentation on the mobile computing tool or through another interface method. Additionally, the coach may access the repair procedure compliance module 251 to assist the coach in offering a recommendation to the disputing parties. Typically, the mediation request is routed to the coach that is most qualified to address the specific issue in dispute.

Figure 3:
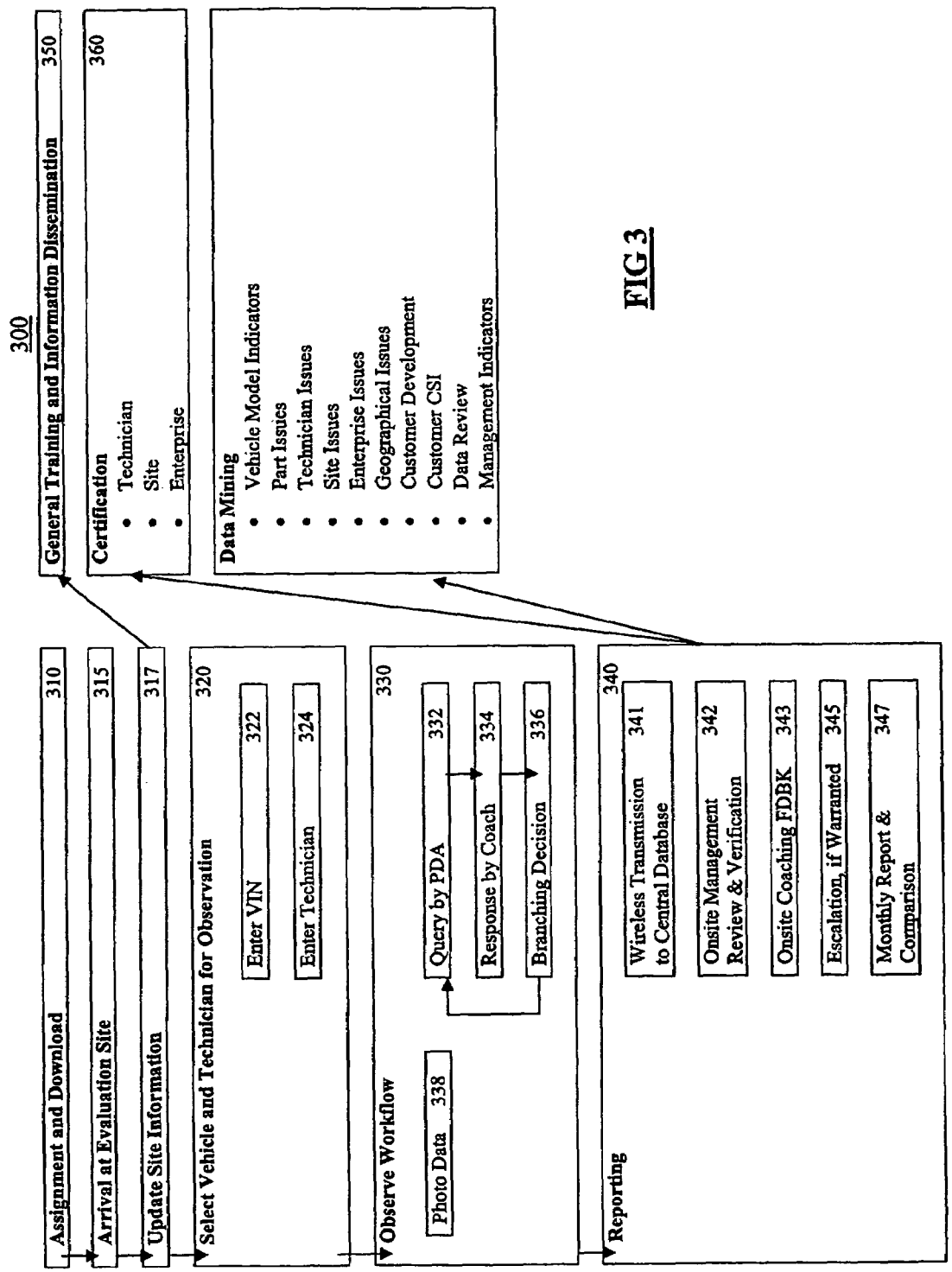
FIG. 3 illustrates acts used in one implementation of a procedure for on-site coaching, review, and certification.

FIG. 3 is a block diagram of one implementation of a procedure for on-site coaching, review, verification and certification. In act 310, a coach is assigned to provide coaching at a client's facility, which may be a collision repair shop or other site installation. The assignment may be downloaded onto a mobile computing tool. Appropriate software and data may be pre-loaded onto the mobile computing tool. If needed information or software is not available on the mobile computing tool, the coach may download the appropriate material onto the mobile computing tool prior to visiting the site installation. The mobile computing tool may assist the coach with directions to reach the site installation, and may provide advance reminders regarding protocol and amenities at the site installation. Other information may also be provided. For example, the mobile computing tool may provide a reminder such as, "Today is technician Ms. Smith's birthday," or "Make initial greeting with shop manager Davis," or "Join the staff for their Friday donuts prior to 7 AM shop opening."

In act 315, the coach arrives at the installation site to be evaluated and checks in with local personnel, aided with reminders by the mobile computing tool. The coach may obtain updated personnel information and other site-specific information at this time and enter such updates into the mobile computing tool so that a central database may be apprised of any changes. Additional initial procedures may be performed, such as an evaluation of shop cleanliness and safety compliances. In act 320, the coach selects a vehicle and a technician performing repairs on the vehicle. The coach may then observe repair activities performed on the vehicle by the technician and record observations on the mobile computing tool. The vehicle may be identified by a vehicle identification number (VIN) or other information that may identify the vehicle in act 322. The technician may be identified by name or by an employee number in act 324. Act 320 may include additional preparatory steps. For example, once the coach has identified the procedures to be observed, the PDA may have an option to automatically print some relevant reference diagrams for the procedures. The printing may be done either with a built-in printer or by transmitting to a local printer or print server via a local IR or RF wireless link.

The coach observes the repairs in act 330. The coach may first consult with the technician to understand what repair procedures are to be performed on the vehicle. The coach then selects an appropriate procedure data set on the mobile computing tool to match the procedures that will be or have been performed by the technician. The mobile computing tool then provides the coach with a series of queries 332 that allow the coach to enter responses 334 regarding the performance of the technician. After each query and response, the mobile computing tool proceeds to the next appropriate query and response to match the next step that should be performed by the technician. In some cases, the mobile computing tool will come to a branching point, at which there may be several possible subsequent steps. At these branching points 336, the mobile computing tool may query the coach to ask which step is being performed next by the technician, or what procedures will be observed next. Alternatively, when appropriate, the mobile computing tool may select a subsequent query based on the coach's response to a previous query.

In addition to entering textual or selection information, a coach may enter photographic information 338 into the mobile computing tool. For example, the coach may use an attached camera (or a camera integrated into the mobile computing tool) to record digital images. The photographs may be stored on the mobile computing tool or in a remote database. Such photographs may be useful to record images of work performed on interior portions of an automobile, before those portions are hidden by outer layers of material during subsequent procedures. Such photographs may also be useful to document the verification of procedures in a workflow. Photographs may also be helpful coaching tools, to illustrate examples of incorrectly performed procedures. Similarly, photographs may be valuable tools for the coaching of technicians with overall good practices, but who could benefit from fine adjustments in technique. Photographs may also be used to record examples of high quality work, for use as examples in providing positive feedback and in coaching other personnel.

After the coach has completed or terminated observation of the procedure, the mobile computing tool then reports the results of the coach's observations in act 340. The mobile computing tool may make a wireless transmission of the observations (or a summary of the observations) to a central database in act 341. This transmission may include an automatic transmission of emails or other communications with appropriate supplemental information that is tailored to the observations made by the coach. For example, if the coach's observations indicate that a technician experienced some difficulty or confusion in the application of seam sealer, the transmission in act 341 may automatically include some links or PDF files or flowchart diagrams or standards requirements that would be instructive to the technician or the technician's manager for further reference and review. For example, the transmission may include relevant step-by-step flowcharts, torque tolerances and limits, a review of optional procedures that may be of interest to a customer, a list of recommended testing techniques to verify the quality of repairs, or other information. Such information may be obtained from a local or a remote repository, such as the reference repository 239.

The coach may review notes on the mobile computing tool to provide a coaching feedback to the technician at the site installation in act 343. Feedback may also be provided to the management personnel at the site installation. The immediate feedback may also include reference material that is manually or automatically selected to be appropriate for the review. Such material may be obtained through the mobile computing tool from the reference repository 239, for example. Additionally, the coach may report on the observations to the management of a site installation in act 342. A report to management may include a combination of observations on several technicians, as well as on support staff, management, and procedures at the site installation.

The coach's reporting may also provide the service of verifying the procedures, workflows, and overall operations observed by the coach at the site installation. Thus, the reporting in act 342 may include both a review and verification of a site installation or the personnel at the site installation. Here, the coach may provide a site installation with the benefit of a third-party review that verifies activities at the site. Such a verification may assist a site installation (and the site installation's sponsoring customers and insurance companies) by providing external evaluations on the workflows performed on specific vehicles, on the competence of technicians, and on the site installation's overall procedures, quality and performance.

The reporting may further include an escalation 345 if the coach determines that the participation of others is needed to provide further coaching, refresher information, feedback, or other actions. The data collected may also be provided in monthly reports, trend graphs, and comparison summaries in act 347. After-visit reporting and coaching may also include interactive communication, such as a scheduled post-visit, "tele-coaching" via telephone or email or coaching in response to follow-up questions from personnel at a site installation. During "tele-coaching," a coach may answer additional questions or resolve issues based on the coach's offsite review of digital images of a vehicle's damage.

The mobile computing tool may provide interfaces for other information collection as well. For example, the mobile computing tool may include interfaces to record changes in the staff at a site location. More specific information may also be recorded, such as an unexpected absence of a technician, or the departure of an experienced manager. Such information may be useful in interpreting monthly reports and performance trends. For example, if a senior technician retires from a site installation, that fact may be helpful in understanding a subsequent dip in a monthly performance review for the site location.

The coach may also be assisted by the mobile computing tool to provide information for generalized ongoing professional improvement 350 to personnel at a site installation. Alternatively, or in addition, the coach may provide individualized professional training to improve the skills of a particular technician, site personnel, site installation, or enterprise. These activities 350 may involve a dissemination of literature, flow diagrams, charts, or other relevant information. For example, the mobile computing tool may include reference information that the coach may consult as needed while answering specific questions during discussions with personnel at a site installation. The mobile computing tool may further include a lecture presentation with a "Topic of the Month" to be provided to an audience of technicians or site personnel at the conclusion of a visit to a site installation. The mobile computing tool may be used to disseminate information for the advancement of professional expertise throughout the course of a site visit, following any initial procedures such as, for example, act 317.

Additional coaching tools may also be provided through the mobile computing tool. For example, the mobile computing tool may include tools for identifying knowledge gaps for particular technicians; site personnel such as managers, estimators, and administrative personnel; site installations; or enterprises as a whole. This identification may be based on data mining of scores and evaluation information received through coaching procedures. Knowledge gaps may be used to generate specific immediate specialized instruction or to prepare an ongoing program for further development. For example, a series of "Topics of the Month" may be selected, or one-on-one personalized coaching provided, or a customized hands-on coaching clinic delivered, based on identified knowledge gaps.

The reporting information assembled in act 340 may be used for more than immediate coaching and periodic review. For example, the data collected by a coach and the subsequent analyses may be used to provide information in support of a certification program 360. Certifications may be made for individual technicians, for site locations, and for enterprises of sites, for example. The data may also be used for data mining, as illustrated in act 370. For example, the data may be searched, either on the coach's mobile computing tool or by a central computer, for correlations, patterns, or subtle connections related to issues arising for particular vehicle models, parts, technicians, site locations, enterprises, and geographical factors, among other issues, and combinations thereof.

The data may also be mined for customer development, to better provide services for the customers of a site installation or enterprise. Data mining may also include customer satisfaction indexing (CSI), which searches for correlations between customer satisfaction and quality of repairs. For example, the mining may seek to determine which positive and negative scores among the various procedures of collision repair have the most significant impact on customer satisfaction as indicated by customer surveys, repeat business, complaints, and compliments. Data mining may also involve a review of data for consistency in the "paperwork" side of a site installation's activities. For example, a software tool may be used to double-check a paper trail (or a data trail) for mistakes in completed workflows (such as a missed intermediate inspection as part of a larger workflow), so that corrections may be made before a workflow is erroneously closed. On another scale, data review may perform ongoing consistency checks to catch unlikely but crucial errors (such as an inadvertent billing for a procedure that was not performed). A further example of data mining may include the mining of management indicators, to ascertain what qualities of management personnel (certifications, personality scores, education, geographical background) have positive or negative correlations with overall customer satisfaction, or with customer satisfaction in various geographical regions.

Figure 4:
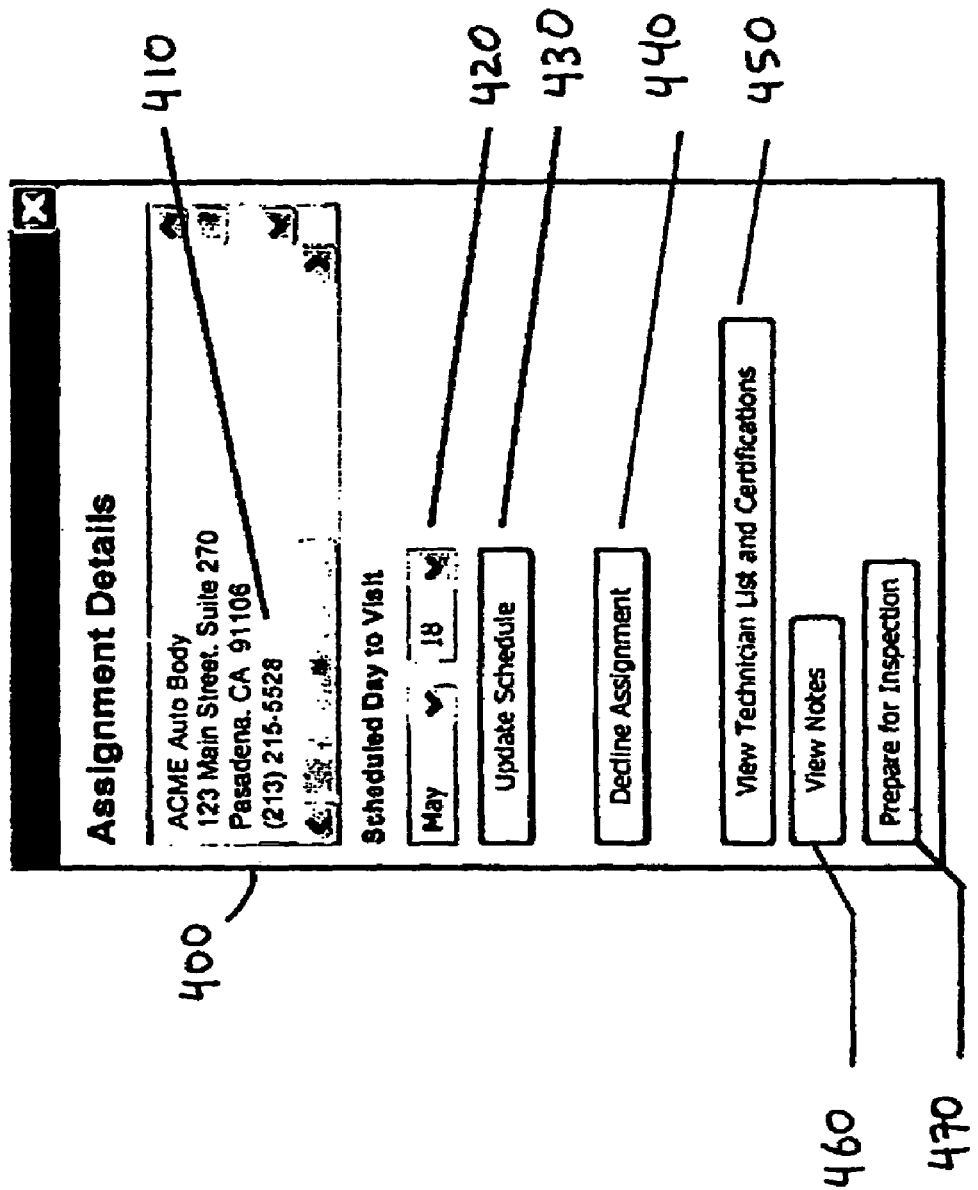
FIG. 4 is an example of a screenshot for a mobile computing tool (such as a personal digital assistant (PDA), laptop or tablet computer, or cellular phone) interface for a coach to review an assignment to visit a site location.

FIG. 4 is an example of a screenshot for a mobile computing tool interface 400 for a coach to review an assignment to visit a site location. The screen allows a coach to obtain from mobile computing tool information such as the name and location 410 of a site location, a scheduled visit date 420, information on personnel at the site location 450, and past notes available on the site location 460. The interface allows the coach to change the scheduled visit date 430, decline the assignment 440, or proceed to subsequent interfaces for the coaching assignment 470.

Figure 5:
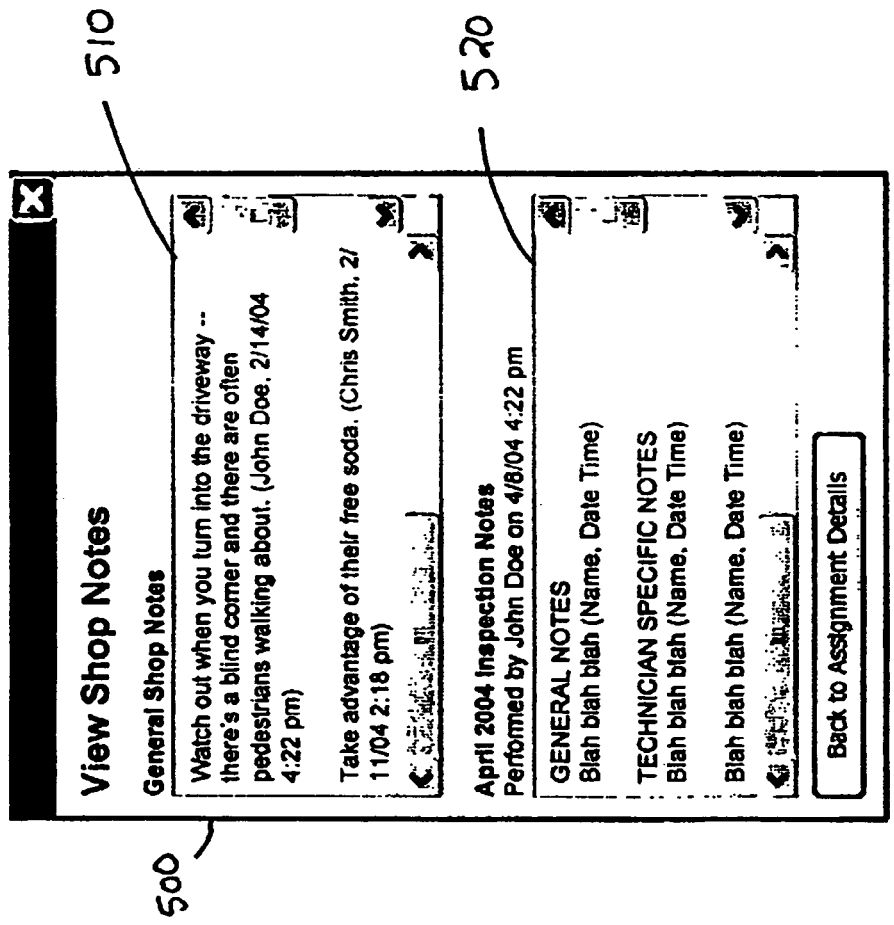
FIG. 5 is an example of a screenshot for a mobile computing tool interface for reviewing notes on a site location.

FIG. 5 is an example of a screenshot for a mobile computing tool interface 500 for reviewing notes on a site location. The screenshot includes notes on general information 510 about a site installation to be visited, and notes from prior coaching visits 520. The prior notes may have been entered by the same coach about to perform a visit, or by a different coach, or by other personnel.

Figure 6:
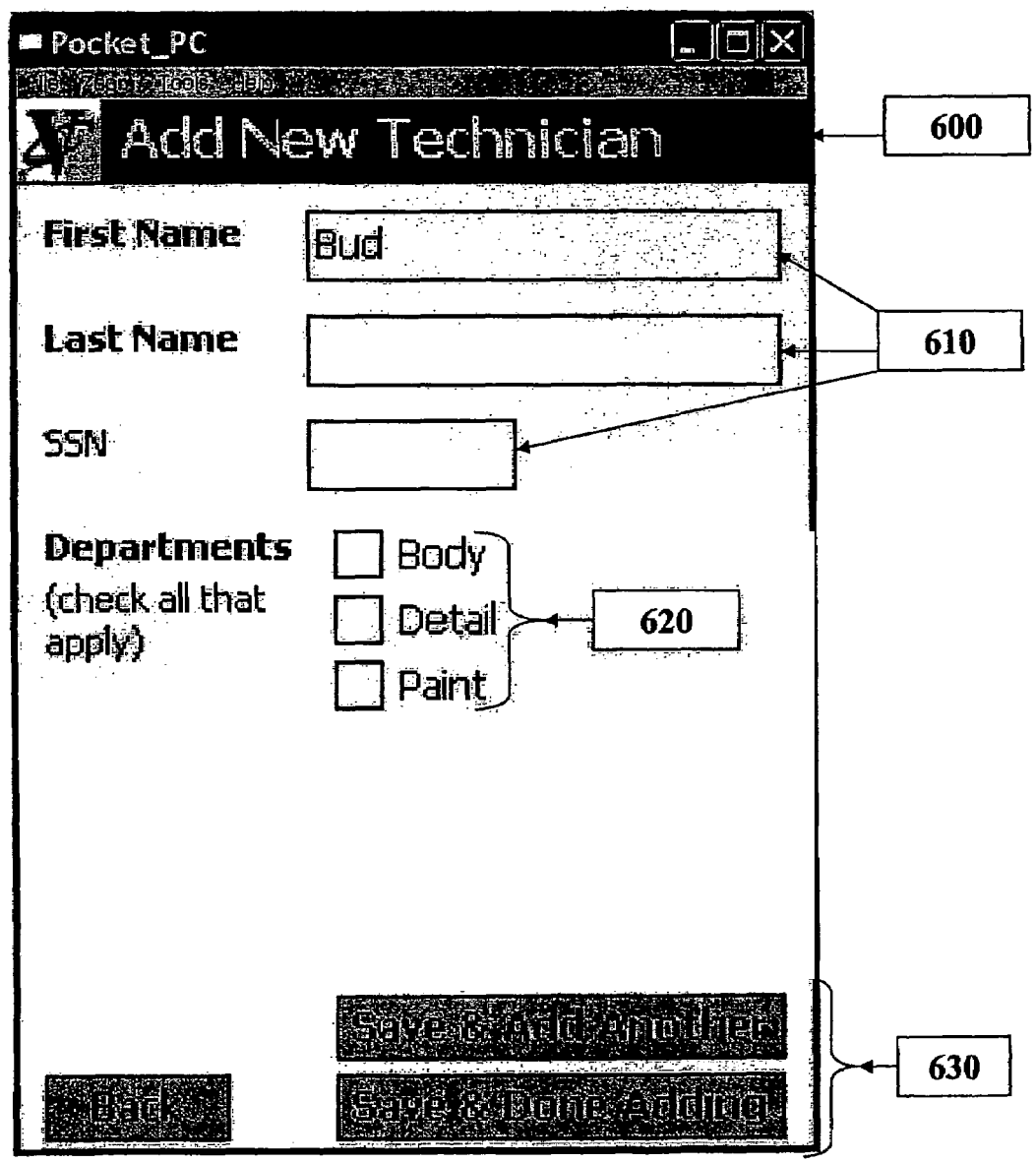
FIG. 6 is an example of a screenshot for a mobile computing tool interface for updating a database with information on a new technician at a site location.

FIG. 6 is an example of a screenshot for a mobile computing tool interface 600 for updating a database with information on a new technician at a site location. The interface allows a coach to enter identifying information 610 for a new technician, along with information on departments or groups in which the new technician may work 620. The coach may navigate to other screens in the mobile computing tool interface 630.

Figure 7:
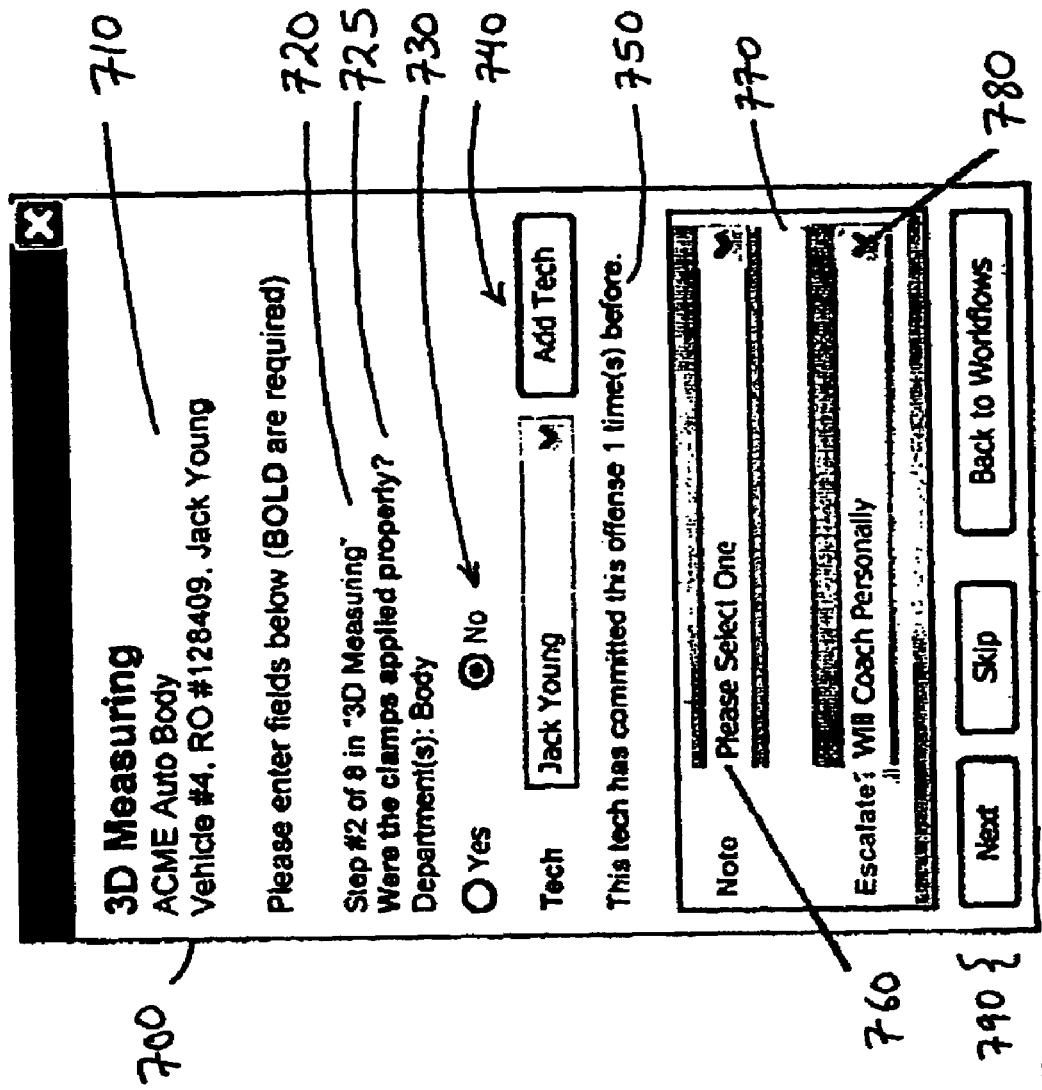
FIG. 7 is an example of a screenshot for a mobile computing tool interface for observing a repair procedure.

FIG. 7 is an example of a screenshot for a mobile computing tool interface 700 for observing a repair procedure. The interface 700 may include identifying information 710 for a site installation being visited. In this example, the interface prompts a coach for review information on a particular step being performed in a vehicle repair/evaluation procedure: "3D measuring" 720. The interface allows the coach to identify the technician performing the step 740. The interface queries a coach on one out of a series of steps—in this case, "Were the clamps applied properly?" 725, and allows the coach to enter a yes/no response 730. The interface also provides the coach with some performance history 750 for the technician on this particular step: "This tech has committed this offense 1 time(s) before."

The interface for this particular step includes further queries 770. For example, a coach may select among one of several reason codes 760 to explain why the technician or site personnel being observed did or did not succeed in this step. The reason codes are a predetermined set of common explanations particular to this step. The coach may also identify further corrective action 780, such as escalating the issue to the attention of the technician's manager, or marking a reminder to pursue individualized coaching for this technician. The interface 700 allows the coach to navigate 790 to other mobile computing tool screens.

FIG. 8 is an example of a screenshot for an interface 800 for interacting with a remote database from a site installation. This interface may be presented on a personal computer so that personnel at a site location may enter information into a remote database. In this example, a personnel manager may update a remote database having with information on a new technician. The interface 800 may display information on the site location 805, and prior information on the technician 810. A user may enter or update information such as name 820, departments 830, experience level 835 (e.g., journeyman or apprentice), address 840, phone information 842, specialties 832, experience 834, and prior certifications 836.

Figure 9:
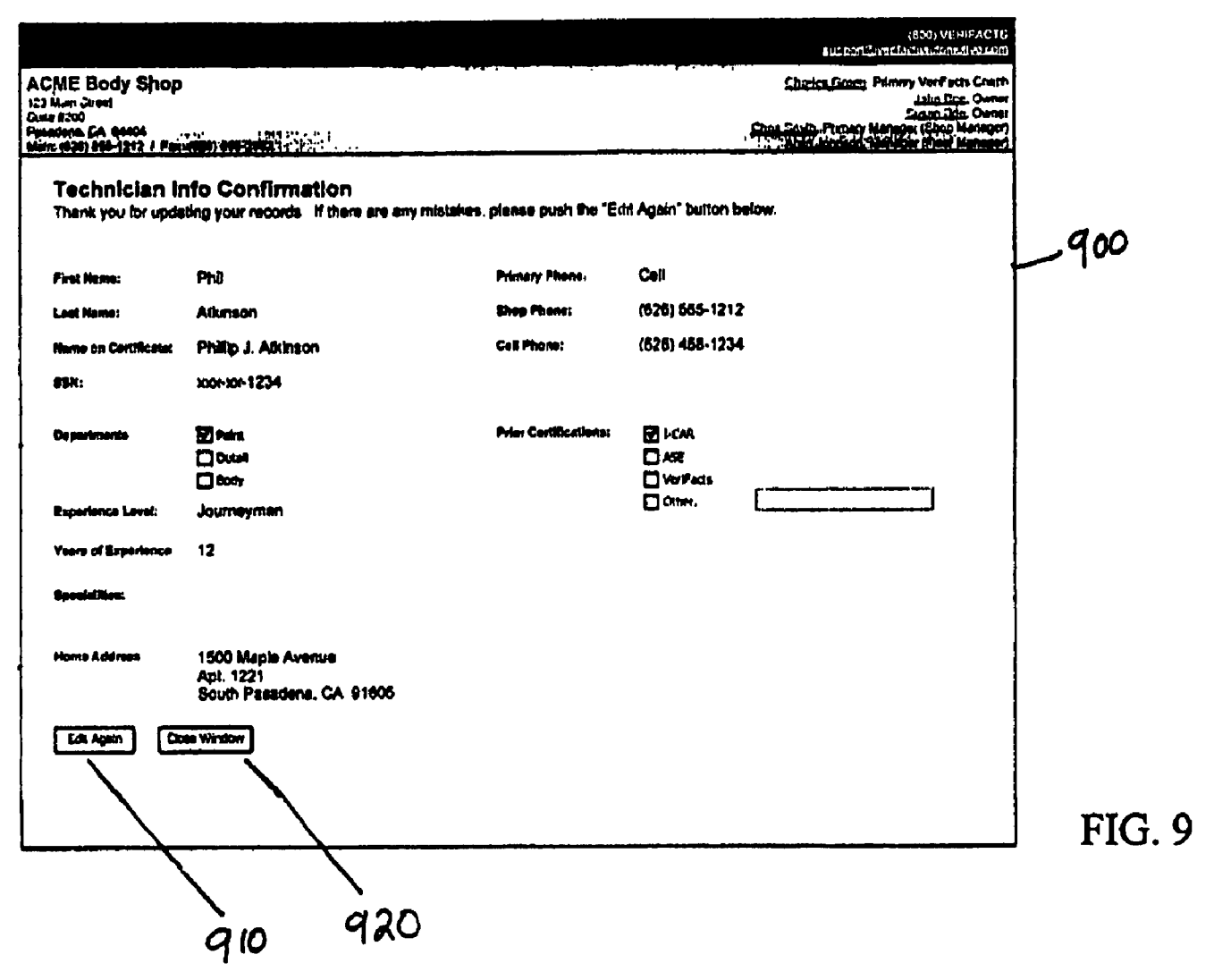

FIG. 9 is an example of a screenshot for an interface 900 for retrieving information from a remote database at a site installation. In this example, a personnel manager may review information about a technician in a remote database. The interface 900 may allow a user to navigate to other interfaces to update 910 the information or proceed to another interface 920, or to terminate a session.

While various embodiments of the invention have been described, it will be apparent to those of ordinary skill in the art that other embodiments and implementations are possible that are within the scope of the invention. Accordingly, the invention is not to be restricted except in light of the attached claims and their equivalents.

The invention claimed is:

1. A system for on-site collection of evaluation data at a vehicle repair site, comprising:
   a mobile computing tool wirelessly connected to a database;
   a workflow operations guiding module operable on the mobile computing tool and configured to query a user for evaluation information on steps performed by technicians in a vehicle repair procedure as specified in the database; and
   an evaluation module configured to receive the evaluation information and to generate a review summary based on the evaluation information.

2. The system of claim 1, where the workflow operations guiding module is configured to receive the evaluation information in the form of at least one of discrete responses or discrete reason codes.

3. The system of claim 2, where the database comprises a matrix holding scoring information indexed by queries and reason codes, and where the evaluation module generates an operation score calculated from scoring information corresponding to received responses.

4. The system of claim 1, where the operations guiding module is configured to receive the evaluation information in the form of a discrete reason code that indicates a selection of one among two or more reason codes.

5. The system of claim 1, where the review summary generated by the evaluation module comprises at least one of a technician score, a site installation score, and a score for a vehicle undergoing repair.

6. The system of claim 1,
   where the workflow operations guiding module is configured to receive the evaluation information in the form of discrete reason codes,
   where the database comprises:
      a matrix holding scoring information indexed by queries and reason codes, and
      weighting information for discrete categories of workflow operations;
   where the evaluation module generates an operation score calculated from scoring information corresponding to received reason codes and from weighting information corresponding to evaluated procedures.

7. The system of claim 1,
   where the workflow operations guiding module is configured to receive the evaluation information in the form of discrete reason codes for each of a plurality of queries posed for a technician under evaluation;
   where the database comprises scoring information corresponding to a collection of reason codes, and weighting information corresponding to a collection of procedures; and where the review summary generated by the evaluation module comprises a technician score calculated according to the formula:

$$\frac{1}{N}\sum_{i=1}^{N} s(q_i, r_i) w,$$

where N represents a number of queries evaluated for the technician under evaluation, s represents scoring information indexed by a query $q_i$, and a received reason code $r_j$, and w represents weighting information corresponding to a procedure under evaluation.

8. The system of claim 7, where the review summary generated by the evaluation module further comprises a site score based on a plurality of technician scores for technicians associated with a site under evaluation.

9. The system of claim 1, where the evaluation module is configured to generate performance coaching information in response to the evaluation information, where the performance coaching information comprises at least one of an identified strengths of a technician's performance; an identified weaknesses of a technician's performance; and suggestions for corrections of a technician's performance.

10. The system of claim 1, where the evaluation module is configured to prepare periodic reports for a site installation based on evaluation information related to the site installation.

11. The system of claim 1, where the evaluation module is configured to communicate an escalation flag in response to consistently poor evaluation information for a technician.

12. The system of claim 1, further comprising a certification module configured to compare the evaluation information against predetermined certification criteria for at least one of a technician, site personnel or site installation.

13. The system of claim 12, where the certification module is further configured to output an analysis of the criteria needed for certification of the technician, site personnel or site installation.

14. The system of claim 1, where the workflow operations module comprises decision points at which procedure steps are selected in response to a user's responses.

15. The system of claim 1, where the repair procedure is an automobile collision repair procedure, or automotive services procedure.

16. The system of claim 1, where the mobile computing tool is configured to transmit the evaluation information wirelessly for storage in the database.

17. The system of claim 1, where the mobile computing tool is a mobile computing tool selected from the group of a personal digital assistant, a laptop computer, a tablet computer, and a cellular phone.

18. The system of claim 1, where the review summary comprises performance review information for at least one of individual technicians, individual site personnel, a site installation, or a group of associated site installations.

19. The system of claim 1, where the database comprises information on a plurality of site installations, where for each installation the database is configured to accept site-specific notes from users.

20. The system of claim 1, where the database comprises information on a plurality of site installations, where for each installation the database comprises notes on at least one of individual technicians, individual site personnel, a site installation, a group of associated site installations, or individual vehicle undergoing repair.

21. The system of claim 1, further comprising an updating interface, where the updating interface is configured to accept information for updating personnel information in the database.

22. The system of claim 1, where the workflow operations guiding module includes a user interface for recording evaluations of technicians performing workflow operations.

23. The system of claim 1, where the workflow operations guiding module includes a user interface for recording (a) a vehicle identifier for a vehicle under repair and (b) evaluations of technicians performing repair procedures during a performance of workflow operations on the vehicle under repair.

24. The system of claim 23, where the vehicle identifier is indicative of a type of the vehicle under repair.

25. The system of claim 23, where the vehicle identifier is a vehicle identification number.

26. The system of claim 1,
where the workflow operations guiding module includes a user interface for recording a vehicle identifier for a vehicle under repair;
where the mobile computing tool is configured to store the vehicle identifier and the evaluation information in the database;
the system further comprising a data-mining module configured to identify correlations among vehicle types and evaluation information in the database.

27. The system of claim 1,
where the mobile computing tool is configured to store the evaluation information in the database;
the system further comprising a data-mining module configured to identify correlations among technicians and evaluation information in the database.

28. The system of claim 1,
where the mobile computing tool is configured to store the evaluation information in the database;
the system further comprising a data-mining module configured to identify correlations among site installations and evaluation information in the database.

29. The system of claim 1, where the workflow operations guiding module includes a user interface for recording evaluations of technicians performing workflow operations during a performance of repair procedures, and for reviewing evaluations of technicians following a performance of workflow operations.

30. The system of claim 1, where the evaluation module is configured to so that the review summary comprises a qualitative evaluation of a repair technician.

31. The system of claim 1, where the evaluation module is configured to so that the review summary comprises a qualitative evaluation of at least one of a repair technician, a vehicle undergoing repair, a vehicle that has been repaired, a site installation, or a group of site installations.

32. The system of claim 1, further comprising a comparison module configured to provide a comparison summary of evaluation information.

33. The system of claim 1, further comprising a comparison module configured to provide a comparison summary of evaluation information for a first technician as compared to an aggregate of evaluation information for technicians.

34. The system of claim 1, further comprising a comparison module configured to provide a comparison summary of evaluation information for a first site installation as compared to an aggregate of evaluation information for site installations.

35. The system of claim 1, further comprising a comparison module configured to provide a comparison summary of evaluation information for a first site installation as compared to site installations associated with the first site installation.

36. The system of claim 1, further comprising a comparison module configured to provide a comparison summary of evaluation information for a first site installation as compared to site installations in a geographical region of the first site installation.

37. The system of claim 1, further comprising a comparison module configured to provide a comparison summary of evaluation information for a first site installation as compared to site installations associated with the first site installation and in a common geographical region with the first site installation.

38. The system of claim 1, further comprising a comparison module configured to provide a comparison summary of evaluation information for a first of site installation as compared to a peer group of site installations.

39. The system of claim 38, where the comparison module is configured to identify peer groups based on data records regarding at least one of ownership demographics, work capacity of site installation, financial characteristics of site installations, or other user-specified criteria.

40. The system of claim 1, further comprising a comparison module configured to provide a comparison summary of evaluation information for a first group of site installations as compared to an aggregate of evaluation information for site installations.

41. The system of claim 1, further comprising a legal compliance module configured to provide verification whether a developed repair blueprint meets legal requirements and complies with the customer's bill of rights for a specific vehicle for which the repair blueprint has been developed.

42. The system of claim 1, further comprising a repair procedure compliance module configured to provide verification whether a developed repair blueprint meets repair rules and standards identified for a specific year, make and model of the vehicle for which the repair blueprint has been developed.

43. The system of claim 1, further comprising:
a reference repository comprising reference information for the workflow operations;
a repository interface configured to retrieve the reference information from the reference database through an information network.

44. The system of claim 43, where the reference information comprises at least one of (a) internet links for information on collision repair materials and processes, (b) articles for teaching collision repair of automobiles, and (c) diagrams indicating procedures for collision repair of automobiles.

45. The system of claim 1, where the mobile computing tool is configured to establish wired connections with the database through at least one of a cradle unit or a USB connection.

46. The system of claim 1, where the evaluation module is configured to display the review summary on the mobile computing tool.

47. The system of claim 1, where the evaluation module is configured to serve the review summary on a network-accessible display page.

48. The system of claim 1, further comprising:
a workflow customization interface linked to the database and configured to modify specifications of a vehicle repair procedure according to instructions from a user.

49. A system for on-site collection of evaluation data at a vehicle repair site, comprising:
a mobile computing tool wirelessly connected to a database;
a workflow operations guiding module operable on the mobile computing tool and configured to query a user for evaluation information on steps performed by technicians in a vehicle repair procedure as specified in the database; and
an evaluation module configured to receive the evaluation information and to generate a review summary based on the evaluation information.

50. A method for providing coaching for repair technicians, the method comprising:
(a) an automated guiding interface generating a first query from a database on a first repair step performed by a repair technician;
(b) receiving a first input in response to the first query;
(c) selecting a second query from the database in response to the received first input;
(d) receiving a second input in response to the second query; and
(e) generating at least one of coaching, evaluation, verification or certification information for the repair technician in response to the first and second inputs.

51. The method of claim 50, where the act (e) includes generating scoring and weighting information.

52. The method of claim 50, where the act (b) is performed synchronously with the first repair step performed by the repair technician.

53. The method of claim 50, further comprising:
wirelessly transmitting the first and second responses for storage in a database.

54. The method of claim 50, further comprising:
storing the first and second responses and information indicative of a type of vehicle under repair in a database; and
mining the database.

55. The method of claim 50, further comprising:
storing the first and second responses and information indicative of a type of vehicle under repair in a database; and
mining the database for correlations between information based on the first response and at least one of the type of vehicle under repair, the repair technician, the site personnel, a site installation, or a group of site installations.

56. A system for preparing feedback information for a collision repair facility, comprising:
a mobile computing tool wirelessly connected to a database;
a workflow operations guiding module operable on the mobile computing tool and configured to query a user for evaluation information on steps completed in a repair procedure for automobile collision repair, where the workflow operations guiding module comprises a user interface for recording evaluations of personnel performing workflow operations during a performance of workflow operations, and for reviewing and recording evaluations of personnel following a performance of workflow operations
an evaluation module configured to receive the evaluation information and to generate performance coaching information in response to the evaluation information, where the performance coaching information comprises identified weaknesses of a technician's performance and suggestions for corrections of a technician's performance; and an updating interface, where the updating interface is configured to accept information for updating personnel information in the database;

where the workflow operations module comprises decision points at which workflow steps are selected in response to a user's responses;

where the evaluation module is configured to compare the evaluation information against predetermined technician-certification criteria, and to output a report of criteria needed for certification of the technician;

where the evaluation module is configured to compare the evaluation information against predetermined site-certification criteria, and to output a report of criteria needed for certification of the site installation;

where the database comprises information on a plurality of site installations, where for each installation the database comprises notes on individual technicians and administrative personnel.

* * * * *

UNITED STATES PATENT AND TRADEMARK OFFICE
CERTIFICATE OF CORRECTION

PATENT NO. : 7,487,018 B2  Page 1 of 1
APPLICATION NO. : 11/196374
DATED : February 3, 2009
INVENTOR(S) : Farzam Afshar et al.

It is certified that error appears in the above-identified patent and that said Letters Patent is hereby corrected as shown below:

In column 19, claim 7, line 14, before "and w represents" delete "$r_j$," and substitute --$r_i$,-- in its place.

In column 20, claim 30, line 50, after "configured" delete "to".

In column 20, claim 31, line 53, after "configured" delete "to".

In column 21, claim 38, line 21, after "for a first" delete "of".

In column 21, claim 44, line 52, after "one of (a)" delete "internet" and substitute --Internet-- in its place.

In column 22, claim 36, line 64, immediately after "workflow operation" insert --;--.

Signed and Sealed this

Twenty-fifth Day of August, 2009

David J. Kappos
*Director of the United States Patent and Trademark Office*